Figure 1:
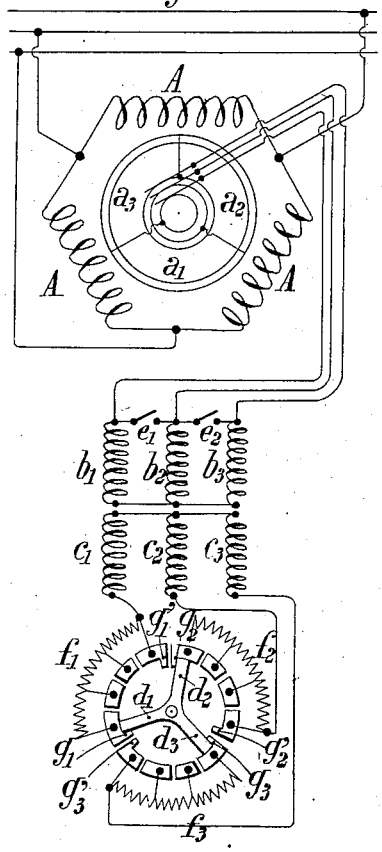

No. 730,013. PATENTED JUNE 2, 1903.
P. J. M. GIRAULT.
MEANS FOR STARTING ELECTROMOTORS WITH ROTATING FIELDS.
APPLICATION FILED AUG. 26, 1901.
NO MODEL. 2 SHEETS—SHEET 1.

Witnesses:
James L. Norris Jr.
John Brown.

Inventor
Paul J. M. Girault.
By James L. Norris
Atty.

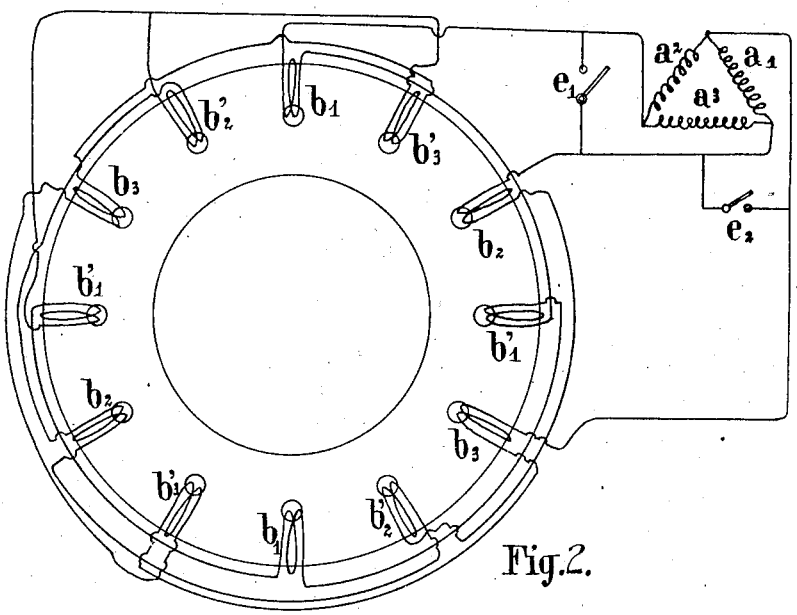
Fig. 2.
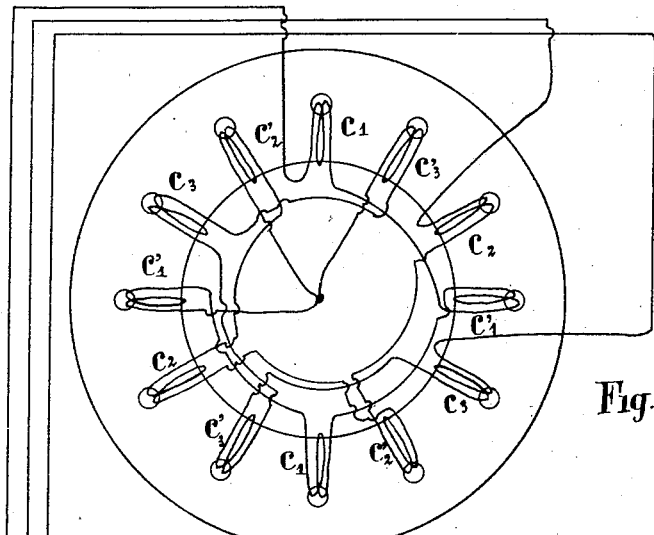
Fig. 3.
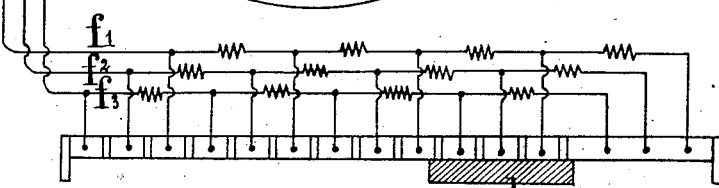

No. 730,013.

Patented June 2, 1903.

UNITED STATES PATENT OFFICE.

PAUL JACQUES MATHURIN GIRAULT, OF PARIS, FRANCE.

MEANS FOR STARTING ELECTROMOTORS WITH ROTATING FIELDS.

SPECIFICATION forming part of Letters Patent No. 730,013, dated June 2, 1903.

Application filed August 26, 1901. Serial No. 73,350. (No model.)

*To all whom it may concern:*

Be it known that I, PAUL JACQUES MATHURIN GIRAULT, engineer, a citizen of the French Republic, residing at Paris, France, (whose post-office address is 71 Rue Pamrémont, XVIII<sup>e</sup> arrondisement, in the said city,) have invented certain new and useful Improvements in Means for Starting Electromotors with Rotating Fields, of which the following is a specification.

The so-called "short-circuit" windings of the armatures of motors with rotating field have either the shape resembling that of a squirrel-cage or that of polyphase coil-windings or that of polyphase windings similar to those of continuous-current machines. If it be wished to obtain for these kinds of armatures the best efficiency at full load, the resistances of their windings are made as small as possible, because the slip for a given torque and a resulting flux in the armature becomes smaller as the said resistances become smaller and because the percentage of loss of energy in the copper of the armature with regard to the total amount of energy supplied thereto increases with this slip; but if it be wished to start such a motor by connecting its inducing-circuits direct to the terminals of a distributing-network these circuits are, on the one hand, traversed by excessive currents, while, on the other hand, the torque for a speed of the armature equal to zero is usually less than the normal torque. There results therefrom an enormous consumption of current, despite which the motor can be seldom properly started. To obviate these disadvantages, a method generally in use consists in switching in the armature-circuits suitable resistances when starting the motor and then in decreasing the values of these resistances as the speed of the motor increases. For the sake of security windings having a small number of coils having a large cross area are adopted for the armature-circuits, so that the electromotive forces induced in the said circuits are low, the value of the ampere-turns of the armature required for the exertion of a given torque being nevertheless obtained by increasing the current intensities; but on account of these great intensities of the armature-current the armature-rheostats must be near the motors, and in the case of a tram-car, for instance, they must be controlled from the platform by means of a mechanical transmission if it is not wished to give too great a length to the big cables connecting the armature with its rheostats. Moreover, the fixed contacts of the rheostats must be also very large, since their surfaces of contact have to be proportional to the current intensities.

The purpose of the present invention is to obviate these disadvantages. The various armature-terminals are connected to corresponding terminals of the primary winding of a transformer comprising the same number of N-phase circuits. The secondary circuits of this transformer are closed through rheostats of variable resistances. These resistances are caused to decrease until a certain value is reached, at which starting takes places. Then these resistances are gradually decreased as the speed of the motor increases. Each time the resistances are decreased, the intensities of the secondary currents, and with them the intensities of the primary currents increases, if it be supposed that there is a determinate electromotive force in each of the N-phase armature-circuits. From this it results that under the ordinary conditions of construction of the motors the torque increases and the speed of the armature increases, or, in other words, the slip of the armature with respect to the inducing-field decreases. The acceleration ceases when the speed reaches a value such that the torque has resumed practically the same value as it had previously, it being presumed for simplicity that a constant-resisting torque is dealt with. It results from the foregoing that a gradual mode of regulation of the speed is obtained. After these operations have been effected the secondary circuits of the transformer are entirely short-circuited. It is then possible to obtain a slight decrease of the slip by short-circuiting the primary circuits of the transformer, and consequently the circuits of the motor-armature.

It will be easily seen that it is possible to give to the secondary circuits of the transformer numbers of coils sufficiently large to obtain only currents as weak as is practically admissible.

In the accompanying drawings, Figure 1 is a diagrammatic view illustrative of my invention, showing a simple alternating-current transformer corresponding to one of the N-phase circuits of the armature. Fig. 2 is a similar view showing an arrangement for a three-phase armature-winding and a three-phase transformer with straight cores, and Fig. 3 is a similar view showing an arrangement for a three-phase armature-winding and a circular transformer.

Simple alternate-current transformers may be used, each corresponding to one of the N-phase circuits of the armature. I prefer to use only one N-phase transformer, which may be of any suitable kind, consisting, for instance, of N straight cores, (save in the case of the two-phase transformer, which will have N 1 or three cores,) or the transformers may be circular. It is well known that N alternating-current transformers can be replaced by single N-phase transformers having N straight-line cores. In the case of diphase currents, however, the transformer with two-phase current which replaces the two single alternating-current (N=2) transformers must have three cores—say N 1 cores, because N equals two.

Fig. 1 shows the application of a three-phase transformer having straight-line cores. A A A are the inducing-circuits of the motor; $a_1\,a_2\,a_3$, the circuits of the armature; $b_1\,b_2\,b_3$, the primary windings of the transformer; $c_1\,c_2\,c_3$, the secondary windings of the said transformer, in the circuits of which resistances $f_1\,f_2\,f_3$ are included, which may be varied by shifting the three-armed handle $d_1\,d_2\,d_3$. Stops $g_1\,g'_1\,g_2\,g'_2\,g_3\,g'_3$ limit the motion of the handle in one direction or the other, the stops $g_1\,g_2\,g_3$ corresponding to the maximum resistances and the stops $g'_1\,g'_2\,g'_3$ corresponding to the maximum resistances. The switches $e_1\,e_2$ are used in short-circuiting the armature-circuits when the resistances $f_1\,f_2\,f_3$ are cut off. These resistances may be varied simultaneously in the same manner on the N-polyphase circuits or may be varied successively on each of them.

It is well known that N alternating-current transformers can be replaced by single N-phase transformers having N straight-line cores. In the case of diphase currents, however, the transformer with two-phase current, which replaces the two single alternating-current (N=2) transformers must have three cores—say N+1 cores, because N equals two. The N-phase transformer may also be replaced by any number of simple or polyphase alternate-current transformers, provided the number of all the primary or secondary circuits of these various transformers be equal to N. Thus in the case of a three-phase armature I may use one simple alternate-current transformer and a two-phase transformer. I may also use a transformer the number of polyphase circuits of which bears a certain ratio to a number of the polyphase circuits of the armature or several monophase transformers, which together fulfil the same conditions. For instance, for a three-phase armature I may use a six-phase transformer.

I may vary the resistances of the N-rheostats included in the N-N-phase secondary circuits of the transformer or transformers simultaneously and in the same way for each of the circuits. It will then be necessary to have a number of contacts equal to M×N for M different positions of the handle and $n$ armature-circuits. Fig. 1 shows such an arrangement for a three-phase armature-winding and also a three-phase transformer with straight cores. The three-phase armature has its circuits triangle-connected. The primary circuits $b_1\,b_2\,b_3$ and the secondary circuits $c_1\,c_2\,c_3$ are star-connected. To the latter circuits the rheostats $f_1\,f_2\,f_3$ correspond, the resistances of which are simultaneously varied in the same manner by means of a three-armed handle, the arms $d_1\,d_2\,d_3$ of which are connected electrically with one another. Stops $g_1\,g_2'$, $g_2\,g_2'$, and $g_3\,g_3'$ limit the motion of the handle in one direction or the other, the stops $g_1\,g_2\,g_3$ corresponding to the maximum resistances and the stops $g_1^1\,g_2^1\,g_3^1$ corresponding to the minimum resistances. The portions of each one of the rheostat resistances $f_1\,f_2\,f_3$ that are successively suppressed by the movement of the handle may be different as regards electrical resistances and cross-section of metals, according to the laws of variations aimed at. When the resistances included in the secondary circuits have been cut off, the slip may still be further slightly decreased by short-circuiting the armature-circuits, which is effected by closing the switches $e_1$ and $e_2$. I may, on the contrary, vary successively the resistances on each of the N-N-phase circuits. Then with the same number M×N of contacts, as before, I obtain about M×N distinct positions of the handle, corresponding to as many values of the slip for a given torque. Fig. 2 shows such an arrangement for a three-phase armature-winding and a circular transformer. The circuits $a_1\,a_2\,a_3$ of the armature are triangle-connected. The transformer is four-polar and has star-connected primary and secondary windings of the series ring-coiled pattern for each one of the three three-phase circuits. This figure has been divided into two parts for the sake of clearness. In order not to confuse the primary and secondary windings, I have shown twice the framework of the transformer. In the upper diagram I have shown only the primary windings $b_1\,b_2\,b_3$ and in the lower diagram only the secondary windings $c_1\,c_2\,c_3$. The bobbins $b_1\,b_2\,b_3\,c_1\,c_2\,c_3$ correspond to one polarity and the bobbins $b_1^1\,b_2'\,b_3'\,c_1'\,c_2'\,c_3'$ to the opposite polarity. To the secondary circuits correspond the rheostats $f_1\,f_2\,f_3$, the resistances to each one of which may be successively varied by shifting a handle or a traveling contact $d$, the width of which must be such that it always connects the three rheostats. When once the resistances included in the secondary circuits are cut off, it is still possible to slightly reduce the slip by short-circuiting the armature-circuits, which is done by closing the switches $e_1$ $e_2$. In the latter case also the variations of resistance for the various positions of the handle may be effected according to any law depending on the requirements of the case—that is, the resistances may be varied by equal or unequal parts. In any case the rheostats may be arranged in a rectilinear, circular, or any other fashion, this without departing from the nature of my invention.

The kinds of armature-windings used may have any of the known polyphase forms adapted to be connected in a circuit with the primary circuits of the transformer or transformers. The windings, together with those of the transformer or transformers, may be grouped in polygon or star connection. The manipulations of the rheostats may be effected by a switch or the like. The armature or the inducing-field may be "rotor" or "stator."

It is obvious that my invention can be utilized both for starting and for regulating the angular velocity of monophase or polyphase alternate-current motors with rotating field, since for one and the same torque the slip depends upon the variation of the resistances inserted in the secondary circuits of the transformer or transformers.

The advantages of my arrangement will be easily understood when it is considered that the transformer may be situated in the proximity of the motor, so that lengthy cables of large cross-sectional area are avoided and the rheostat for the secondary circuits and its fixed contacts can be situated anywhere. For instance, in the case of an electric tramcar the manipulation may be effected through the controlling apparatus itself. In any case the most practical and economical arrangement as regards ease of manipulation and first cost of construction can be easily determined for each special installation.

In a copending application, Serial No. 57,625, filed by me of even date herewith, I disclose an invention of the same nature as that herein disclosed, the distinction between the two being that according to the invention in the other case I operate by short-circuiting progressively the several sections of a transformer having a single winding, whereas according to the invention in the present application I decrease progressively the value of the resistance placed on the secondary winding of a transformer without subjecting this secondary winding to any modification.

Having now particularly described and ascertained the nature of my invention and in what manner the same may be performed, I declare that what I claim is—

In an alternating-current motor having a revolving field, an armature therefor having N-phase windings, a transformer having the same number of N-phase circuits, circuit connections between the several armature-terminals and the corresponding terminals of the primary winding of said transformer and variable N-phase resistances through which the secondary circuits of said transformer are closed, the said resistance being varied simultaneously or successively, whereby a sufficient starting torque is produced in said motor without introducing resistances in the armature and without the use of currents of exaggerated intensity.

In testimony whereof I have hereunto set my hand in presence of two subscribing witnesses.

PAUL JACQUES MATHURIN GIRAULT.

Witnesses:
EDWARD P. MACLEAN,
HENRY SCHWAB.